July 22, 1930.  M. W. MOESTA  1,770,941

VEHICLE BODY CONSTRUCTION

Original Filed April 4, 1927

INVENTOR
MARVIN W. MOESTA.
BY
ATTORNEY

Patented July 22, 1930

1,770,941

UNITED STATES PATENT OFFICE

MARVIN W. MOESTA, OF DETROIT, MICHIGAN, ASSIGNOR TO THE MURRAY CORPORATION OF AMERICA, A CORPORATION OF DELAWARE

VEHICLE BODY CONSTRUCTION

Original application filed April 4, 1927, Serial No. 180,667. Divided and this application filed December 27, 1927. Serial No. 242,638.

This invention relates to vehicle bodies, and is a division of my application for Letters Patent of the United States for improvements in vehicle bodies filed April 4, 1927, Serial No. 180,667.

The principal object of the present invention is to provide a new and novel pillar construction for use in vehicle bodies which will be simple in construction, of relatively great strength and light weight, and economical to produce.

Another object is to provide a pillar for vehicle bodies and the like formed from a pair of sheet metal stampings whereby to form a double box girder construction.

A further object is to provide a pillar construction for vehicle bodies and the like comprising a Z-shaped member having one end thereof reversely bent to form a channel, the other of the members cooperating therewith to close the channel, thereby forming one box section and extending therefrom in spaced relationship with respect to the first member to a point adjacent the opposite end thereof where the parts are again secured together to form a second box section, one of the outer sides of the channel forming the bottom of a window guide channel.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the views,—

Figure 1:
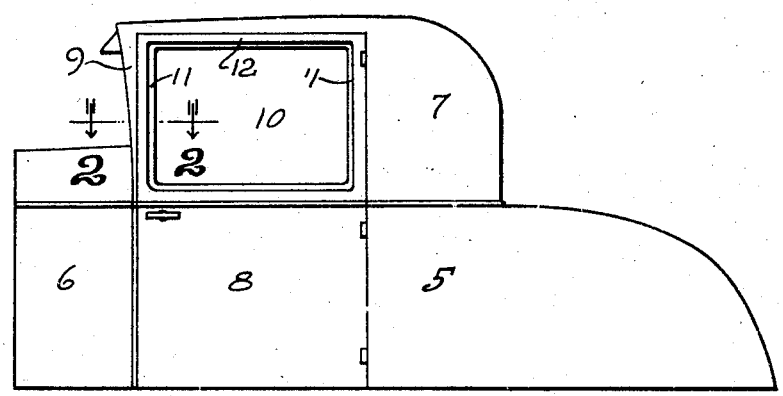
Fig. 1 is a side elevation of an automobile body.

In the drawings I show an automobile body comprising a main body portion 5, cowl portion 6 and top 7. The usual door 8 is provided for entrance and exit to and from the body. As indicated in Fig. 1, the body is provided with the usual front pillar 9 and the door is provided with the usual glass 10 received in the frame formed on the upper portion thereof and comprising the usual door side pillars 11 and top frame member 12.

Figure 2:
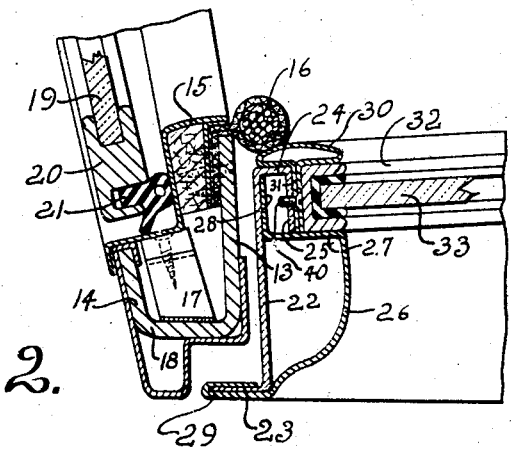
Fig. 2 is a sectional view taken horizontally through one of the body pillars and cooperating door pillar.

As indicated in Fig. 2, the body pillar 9 is constructed of channel shaped metal and having the rear channel side 13 thereof of substantially greater width than the front channel side 14. The channel between the sides 13 and 14 is covered by an L-shaped panel 15 which also secures the wind strip 16 along the edge of the channel side 13. The panel 15 is intermediately supported by clips 17 which are welded to the bottom channel 18. A wind shield 19 having a frame 20 in the edge of which is fitted a wind strip 21 bears against the panel 15, as shown, and forms a closure for the upper portion of the frame member.

The door pillar 11, as indicated in Fig. 2, comprises a Z-shaped sectioned sheet metal stamping having a leg portion 22 and end portions 23 and 24 respectively. The outer edge 25 of the end portion 24 is bent back into spaced and substantially parallel relationship with respect to the leg portion 22 whereby to form a channel. A second sheet metal stamping, preferably of less thickness than the first mentioned stamping and comprising a curved portion 26, a wall portion 27, marginal flange 28 and edge portion 29 is secured to the first stamping by securing the marginal flange 28 to the leg 22 with the same received within the channel formed between the portions 22, 24 and 25 and with the wall portion 27 in contact with and preferably welded or otherwise suitably secured to the free edge of the portion 25. The end portion 29 is extended over and bent back on the end 23 so as to clamp the same therebetween. It will be obvious that by this construction the open end of the channel formed by the leg 22 and portions 24 and 25 is closed by the wall portion 27, and results in a box section, and that the portion 22, wall 27 and curved portion 26 combine to form a second box section lying in parallel and adjacent relationship with respect to the first box section, and that these two box sections are formed solely by the employment of the two sheet metal parts. The resulting structural strength is obvious and it will be readily understood that a pillar formed in accordance therewith may be made of lighter material or of smaller dimensions than in the conventional constructions and still retain the same structural strength.

To the outer face of the portion 25 is secured a T-shaped molding member comprising the head portion 30 and leg portion 31. The leg portion 31 is secured against the outer face of the portion 25 with one-half of the head of the T extended rearwardly in spaced and parallel relationship with respect to the wall 27, thereby to form a channel in which the resilient channel 32 for the window glass 33 is received.

The leg portion 31 of the T molding is secured to the reversely bent flange 25 of the door pillar by screws 40 as shown. Thus the fastening means for the T molding are concealed by the glass channel 32 which adds materially to the appearance and finish of the work.

Although I have described the present construction in combination with a door pillar, it will be apparent that in its broad aspect it may equally well be adapted for use as a body pillar by slight modifications therein, such as are within the scope of the ordinary person skilled in the art, and formal changes may be made in the specific embodiment of the present invention without departing from the spirit or substance of the broad invention, the scope of which is commensurate with the appended claims.

What I claim is:

1. A vehicle door pillar comprising a relatively thin metal bar having a comparatively wide web portion, a lateral flange on its outer edge constituting a door stop and molding support and having a rearwardly and return bent portion on its inner edge forming with a portion of the web three sides of a box section, a metal strip having its outer edge bent about and secured to the lateral outside flange of said metal bar and having its inner portion bent to form one side of a glass run channel and to form the fourth side of said box section, a T-shaped metal molding strip having its leg portion resting upon and secured to the return bent portion of said metal bar and forming the bottom of a glass run channel, and having one of its arm portions forming a side for said glass run channel.

2. A pillar for a vehicle door comprising a relatively thin metal bar having a lateral flange on its outer edge, and having a rearwardly and return bent flange on its inner edge, a metal strip having its outer edge bent about and secured to the outer flange of said bar and having its inner portion bent to form a side for a glass run channel abutting the inner edge of the return bent flange of said bar, a metal molding strip of T-shape in cross section having its leg resting upon and secured to the return bent flange of said bar and having one arm thereof forming a second side for a glass run channel.

3. A pillar for a vehicle door comprising a sheet metal bar having a lateral flange on its outer edge forming a door stop and molding support and having a rearwardly and return bent flange on its inner edge forming a reinforcement and support for a glass run channel, a strip metal member having its outer edge bent about and secured to the outer flange of said metal bar and its inner portion bent to form a side for a glass run channel, a second member of T-shape in cross section having its leg portion resting upon and secured to the return bent flange of said metal bar and its leg and one side portion positioned to complete said glass run channel.

4. A pillar for a vehicle body comprising a pair of sheet metal members, the first member being Z-sectioned and having one of its ends bent back to form an inwardly opening channel, the second member being of generally trough-shaped section and provided with a marginal flange, said marginal flange being secured to the web of said Z with the adjacent portion thereof bent up and secured in contact with the free edge of said channel thereby closing the same and forming one box section, and the opposite edge of said second member being secured to the other flange of said first Z member thereby forming a second box section.

MARVIN W. MOESTA.